United States Patent
Robinson et al.

(10) Patent No.: US 9,324,012 B2
(45) Date of Patent: Apr. 26, 2016

(54) METHODS, SYSTEMS AND APPARATUS FOR CLEAR TEXTURING

(75) Inventors: David C. Robinson, Penfield, NY (US); Katherine Loj, Rochester, NY (US); Guo-Yau Lin, Fairport, NY (US); Frederick J. Ramsey, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 1308 days.

(21) Appl. No.: 13/011,169

(22) Filed: Jan. 21, 2011

(65) Prior Publication Data

US 2012/0189776 A1     Jul. 26, 2012

(51) Int. Cl.
| | | |
|---|---|---|
| *B41J 2/01* | (2006.01) | |
| *G06K 15/00* | (2006.01) | |
| *G03G 15/00* | (2006.01) | |
| *G06K 15/02* | (2006.01) | |

(52) U.S. Cl.
  CPC ............ *G06K 15/1882* (2013.01); *G03G 15/55* (2013.01); *G03G 15/556* (2013.01); *G06K 15/002* (2013.01)

(58) Field of Classification Search
  CPC .. B41J 2/0458; B41J 2/04541; B41J 2/04563; B41J 2/2128; B41J 2/2132; B41J 11/42; B41J 29/393; B41J 2202/02; B41J 2/14; B41J 2/2114; B41J 11/0015; B41J 2202/09; B41M 5/0017; G02B 5/201; G03G 15/55; G03G 15/556; G03G 15/5025; G03G 15/5075; G03G 15/5087; G03G 15/32; G03G 15/36; G03G 15/0863
  USPC ............... 347/5, 9, 12, 14, 15, 16, 19, 21, 98, 347/101, 104, 106, 107; 427/265; 118/696; 399/27, 40, 41, 231, 82, 341; 358/3.06, 358/308, 3.09, 3.1
  See application file for complete search history.

(56) References Cited

U.S. PATENT DOCUMENTS

| | | | | |
|---|---|---|---|---|
| 4,739,377 | A * | 4/1988 | Allen ................... | G03G 15/507 355/133 |
| 5,751,432 | A * | 5/1998 | Gwaltney ....................... | 358/296 |
| 6,348,969 | B1 * | 2/2002 | Ikeda ........................... | 358/1.15 |
| 6,880,463 | B2 * | 4/2005 | De Meulemeester .. | G03G 7/006 101/424.1 |
| 6,954,276 | B2 * | 10/2005 | Lapstun et al. ................ | 358/1.1 |
| 7,212,772 | B2 * | 5/2007 | Kasiske et al. ................ | 399/182 |
| 7,295,341 | B2 * | 11/2007 | Nagarajan et al. ............. | 358/1.9 |
| 7,301,675 | B2 * | 11/2007 | Wang et al. ................... | 358/3.06 |
| 7,391,537 | B2 * | 6/2008 | Eschbach et al. ............. | 358/3.06 |
| 7,654,657 | B2 * | 2/2010 | Seshimo ......................... | 347/85 |
| 7,684,076 | B2 * | 3/2010 | Shapovalov ................. | 358/1.17 |
| 7,813,006 | B2 | 10/2010 | Liu et al. | |
| 8,072,646 | B2 * | 12/2011 | Mestha ................. | H04N 1/6058 358/1.9 |
| 8,120,819 | B2 * | 2/2012 | Hirokawa et al. ............ | 358/3.28 |

(Continued)

FOREIGN PATENT DOCUMENTS

JP       2009301576 A  *  12/2009  ............. B41J 2/2114

*Primary Examiner* — An Do
(74) *Attorney, Agent, or Firm* — Fay Sharpe LLP

(57) ABSTRACT

Disclosed are a method and system of rendering clear texturing on a media substrate. According to one exemplary method, one or more parameters are provided by a user, via a UI (User Interface), to control the clear texturing process, wherein the parameters are associated with, but are not limited to, media sheet area coverage, object type the clear texturing process is to be performed on and maximum/minimum percentage of clear material to be used for rendering the clear texturing.

12 Claims, 5 Drawing Sheets

(56) References Cited

U.S. PATENT DOCUMENTS

| | | | |
|---|---|---|---|
| 8,213,035 B2* | 7/2012 | Fukuda | 358/1.15 |
| 8,317,289 B2* | 11/2012 | Chretien et al. | 347/14 |
| 8,330,992 B2* | 12/2012 | Kuroda | 358/1.9 |
| 8,477,376 B2* | 7/2013 | Robinson et al. | 358/1.9 |
| 8,500,263 B2* | 8/2013 | Taya | 347/95 |
| 2003/0007814 A1* | 1/2003 | Richards | 399/341 |
| 2005/0040643 A1* | 2/2005 | Mancuso | B41M 3/148 283/114 |
| 2005/0243341 A1* | 11/2005 | Ng | 358/1.9 |
| 2005/0284314 A1* | 12/2005 | Coulter | B41M 1/12 101/129 |
| 2006/0114481 A1* | 6/2006 | Moore | 358/1.9 |
| 2008/0170269 A1* | 7/2008 | Kaneko et al. | 358/3.28 |
| 2008/0193860 A1* | 8/2008 | Hains | 430/5 |
| 2009/0067905 A1 | 3/2009 | Fisher et al. | |
| 2009/0097046 A1* | 4/2009 | Ohta et al. | 358/1.9 |
| 2009/0097063 A1* | 4/2009 | Mizuno | G03G 21/043 358/1.15 |
| 2009/0190148 A1* | 7/2009 | Yabe | G03G 15/36 358/1.9 |
| 2009/0244158 A1* | 10/2009 | Hara | 347/16 |
| 2009/0263172 A1 | 10/2009 | Kovacs | |
| 2009/0316165 A1 | 12/2009 | Mestha et al. | |
| 2011/0043840 A1* | 2/2011 | Iinuma | 358/1.9 |
| 2011/0052290 A1* | 3/2011 | Kurakata | G03G 15/6585 399/388 |
| 2011/0090521 A1* | 4/2011 | Ohta et al. | 358/1.9 |
| 2012/0063802 A1* | 3/2012 | Suzuki | G03G 15/6585 399/82 |
| 2012/0107007 A1* | 5/2012 | Qiao et al. | 399/82 |

* cited by examiner

METHODS, SYSTEMS AND APPARATUS FOR CLEAR TEXTURING

CROSS REFERENCE TO RELATED PATENTS AND APPLICATIONS

This application relates to application Ser. No. 12/913,226, filed Oct. 27, 2010, now U.S. Pat. No. 8,447,204, issued May 21, 2013, by Qiao et al. entitled SIMULATED PAPER TEXTURE USING CLEAR TONER ON UNIFORM SUBSTRATE, and the disclosure of such application is hereby incorporated by reference.

BACKGROUND

The present disclosure is related to methods, systems and apparatus for clear texturing. More specifically, to clear texturing on a media substrate associated with a printing apparatus.

A substrate carries information in the form of images, graphics, and textual content. Oftentimes, the substrate carries additional information in the form of an identifier, such as an authenticating mark or a watermark. A first type of mark is selectively detectable. The mark is not viewable under casual inspection. Rather, a visual aid alters a viewing condition to make the mark viewable. An example of the first type of mark includes a fluorescent watermark. The fluorescent watermark may be made viewable when an illuminant alters a light condition used to control either toner or substrate reflection. A second type of mark is detectable under casual inspection. An example of the second type of mark may include a raised surface portion on the substrate. Another example may include an image rendered on the surface portion.

The image is formed by applying a colored or monochrome ink or toner to the substrate. A lighter application of ink or toner is applied to the substrate as compared to a heavier application provided for the content. The lighter ink- or toner-application provides the mark with a generally washed out appearance. However, the image may still interfere with a viewer's ability to read the content also carried on the substrate. This difficulty is especially the case when a colored toner layer, used for the mark, is situated directly beneath the content layer. Accordingly, there is needed a new way of presenting marks. A mark is desired to include a generally transparent appearance. More particularly, a generally transparent mark is desired for casual inspection, whereby the mark includes a characteristic that makes it easily identifiable.

Generally, many known devices support an application for a light grey colored mark. This mark is rendered using a light application of monochrome ink or toner. However, there is needed a system for creating a mark formed with a clear toner layer. More particularly, there is needed a system for creating the mark in conjunction with additional information applied with a colored toner layer.

BRIEF DESCRIPTION

A method of printing clear texturing on a media substrate associated with a printing apparatus is disclosed. The printing apparatus including a UI (User Interface), a controller and a printing device, and the method comprising a) receiving one or more user selectable instructions from the UI to execute a clear texturing process to be performed on the media substrate, wherein the user selectable instructions include parameters associated with a clear textured first image to be printed on the media substrate; b) receiving image data associated with a second image to be printed on the media substrate using one or more colorants not associated with the clear texturing process, the first image and second image distinct; and c) printing the clear textured first image and the second image on the media substrate.

A printing apparatus is disclosed, the printing apparatus including a UI (User Interface); a printing device; and a controller operatively connected to the UI and printing device, the controller configured to execute computer readable instructions, that when executed, perform a method of printing clear texturing on a media substrate associated with the printing device, the method comprising: receiving one or more user selectable instructions from the UI to execute a clear texturing process to be performed on the media substrate, wherein the user selectable instructions include parameters associated with a clear textured first image to be rendered on the media substrate; b) receiving image data associated with a second image to be rendered on the media substrate using one or more colorants not associated with the clear texturing process, the first image and second image distinct; and c) printing the clear textured first image and the second image on the media substrate.

A computer program product storing computer readable instructions is disclosed, that when executed by a controller, cause the controller to perform a method of printing clear texturing on a media substrate associated with a printing apparatus including a UI (User Interface), the controller and a printing device, the method comprising a) receiving one or more user selectable instructions from the UI to execute a clear texturing process to be performed on the media substrate, wherein the user selectable instructions include parameters associated with a clear textured first image to be printed on the media substrate; b) receiving image data associated with a second image to be printed on the media substrate using one or more colorants not associated with the clear texturing process, the first image and second image distinct; and c) printing the clear textured first image and the second image on the media substrate.

DETAILED DESCRIPTION

Figure 1:
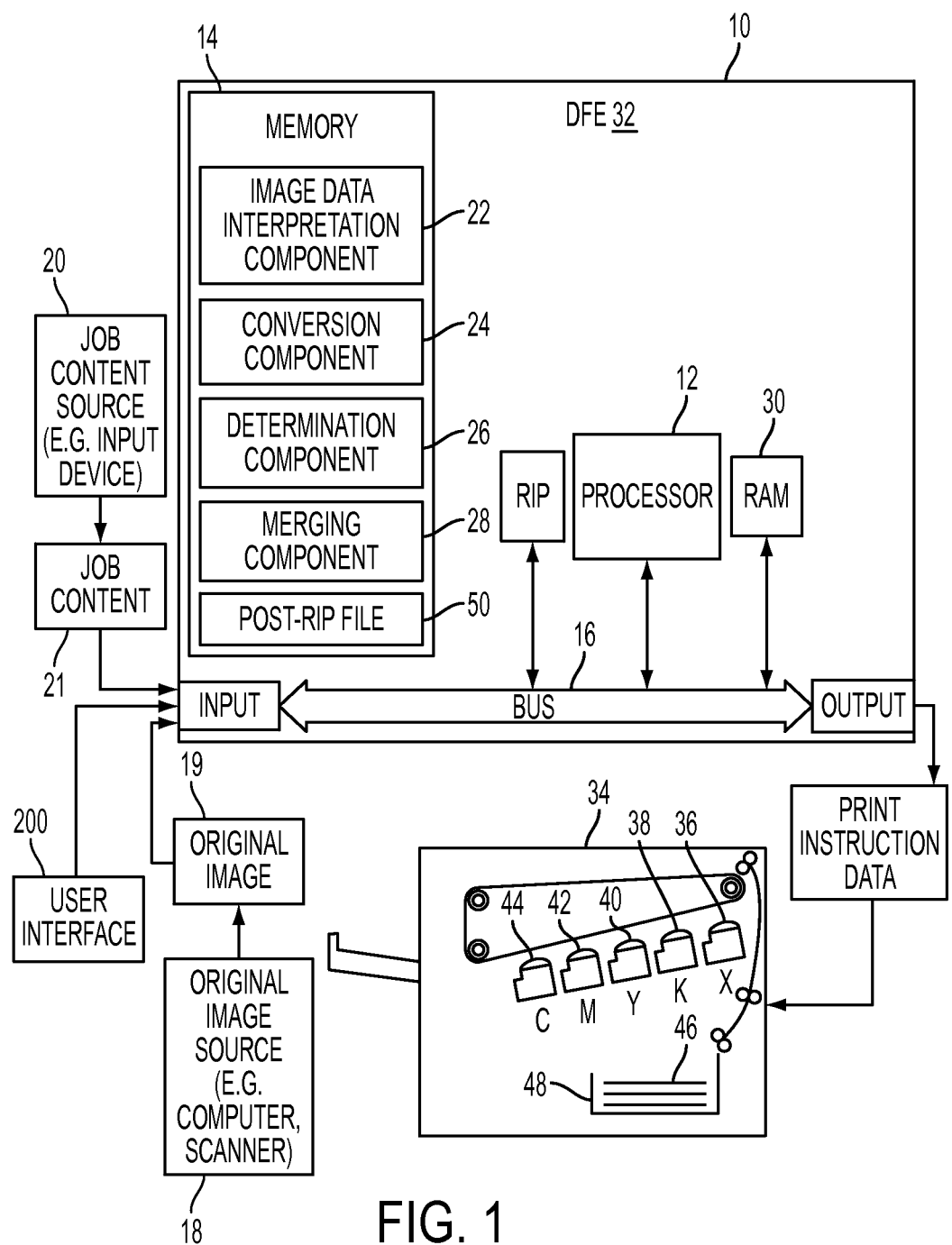
FIG. 1 illustrates a computer system for rendering a job using a form of the disclosure.

With the advent of "clear" toner and ink and machines capable of printing clear inks in addition to CMYK, new options are available to users of printing systems. In particular, and according to aspects of this disclosure, texture effects can now be added to printed materials. By printing a clear toner pattern over the top of a CMYK image a unique texture or 3D effect can be added. According to one exemplary embodiment of this disclosure, the system is provided in which a machine operator selects a texture or set of textures that are applied to select regions or objects on a page. A variety of attributes are programmed by the operator using a clear pattern GUI (Graphical User Interface). Once the setup is complete, a full page clear color plane image is created and submitted along with the print job to a Digital Front End (DFE). According to one exemplary embodiment, the DFE in turn decomposes the CMYK image along with the clear image and creates a 5 plane bitmap. Some advantages include introduction of a new print feature, texturing, and the ability to provide texture on select object types.

Clear toner allows the ability to create a unique IQ (Image Quality) effect when added to a CMYK printed page and a clear toner system enables the association of clear texturing with object types/pages. Furthermore, a default set of textures can be made available for DFE operator selection and DFE operators can also import or create textures. The textures are applied by building, for example, via a decomposer, a clear image plane from the texture. The texture is applied on the proper portion of the incoming PDL's pages via mask and merge functionality in the decomposer.

A "clear pattern" GUI FAB (Feature Access Button) is made available to the DFE operator. The FAB, i.e. user interface, includes selections for:
1. clear pattern;
2. full page (yes or no);
3. object type the texture (full page must be set to NO) is associated with including:
   a. images;
   b. text;
   c. graphics; and
   d. spot colors;
4. maximum percentage of clear to be used for the pattern;
5. full page texture method with the following choices:
   a. stretch/shrink; and
   b. step and repeat/clip.

According to one exemplary embodiment, the FAB has a preview option which displays the clear texture using an alternate color (e.g., yellow).

According to another exemplary embodiment, textures are made available through a default list of textures.

In addition, the operator has the ability to add new textures developed in applications. Also, textures available to other applications can be imported to the DFE.

According to one exemplary embodiment, textures from images can be generated where incoming images composed of gray, CMYK, RGB, clear only, gray+clear, CMYK+clear, RGB+clear are converted to a clear only form using a clear color plane. The conversion is accomplished by converting to the PCS of CIELAB. The L* values are used to populate the clear plane. The other planes are left blank.

According to one exemplary embodiment, the default precedence model for a job where clear texturing is specified, is texturing overriding any clear content defined in the PDL.

The decomposer builds a full page clear texture plane. The full page texture method (e.g. stretch/shrink) determines how the pattern is fit to the page.

Using the context/knowledge of object types within a job, the decomposer creates a mask plane which designates where the pattern will and will not be added to the page (e.g., on top of images within the page). The textures are added to the clear plane of the page's xm2 files in the decomposer. The decomposer can then make intelligent decisions for ink limit. Alternatively the addition can be made downstream in compression or marker code (ink limiting algorithm will be crude).

The maximum clear percentage selection is set to the largest clear value to be used within the pattern—the value may be reduced by the decomposer based on the ink limit of the IOT. Other lesser clear values within the texture are linearly scaled.

As previously discussed, the present disclosure is directed to a system that enables a development of clear toner forms. In addition, the disclosure is further directed toward a method for rendering a mark using a user configurable form including a clear textured pattern adapted to provide job data.

Pigmented, colored toners are used herein to apply the content to the substrate. The content may include information in electronic form which is to be rendered on the substrate or print media by an image forming device. The content may include text, graphics, pictures, and the like. The process for applying the content and the mark to the substrate is herein referred to as printing or marking.

As used herein, the image forming device can include any device for rendering an image on print media, such as a copier, laser printer, bookmaking machine, facsimile machine, or a multifunction machine (which includes one or more functions such as scanning, printing, archiving, emailing, and faxing). "Print media" can be a usually physical sheet of paper, plastic, or other suitable physical print media substrate for carrying images. A "print job" or "document" is referred to for one or multiple sheets copied from an original print job sheet(s) or an electronic document page image, from a particular user, or otherwise related. An original image is used herein to mean an electronic (e.g., digital) or physical (e.g., paper) recording of information. In its electronic form, the original image may include image data in a form of text, graphics, or bitmaps.

The term "software" as used herein is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on the server or other location to perform certain functions.

Figure 3:
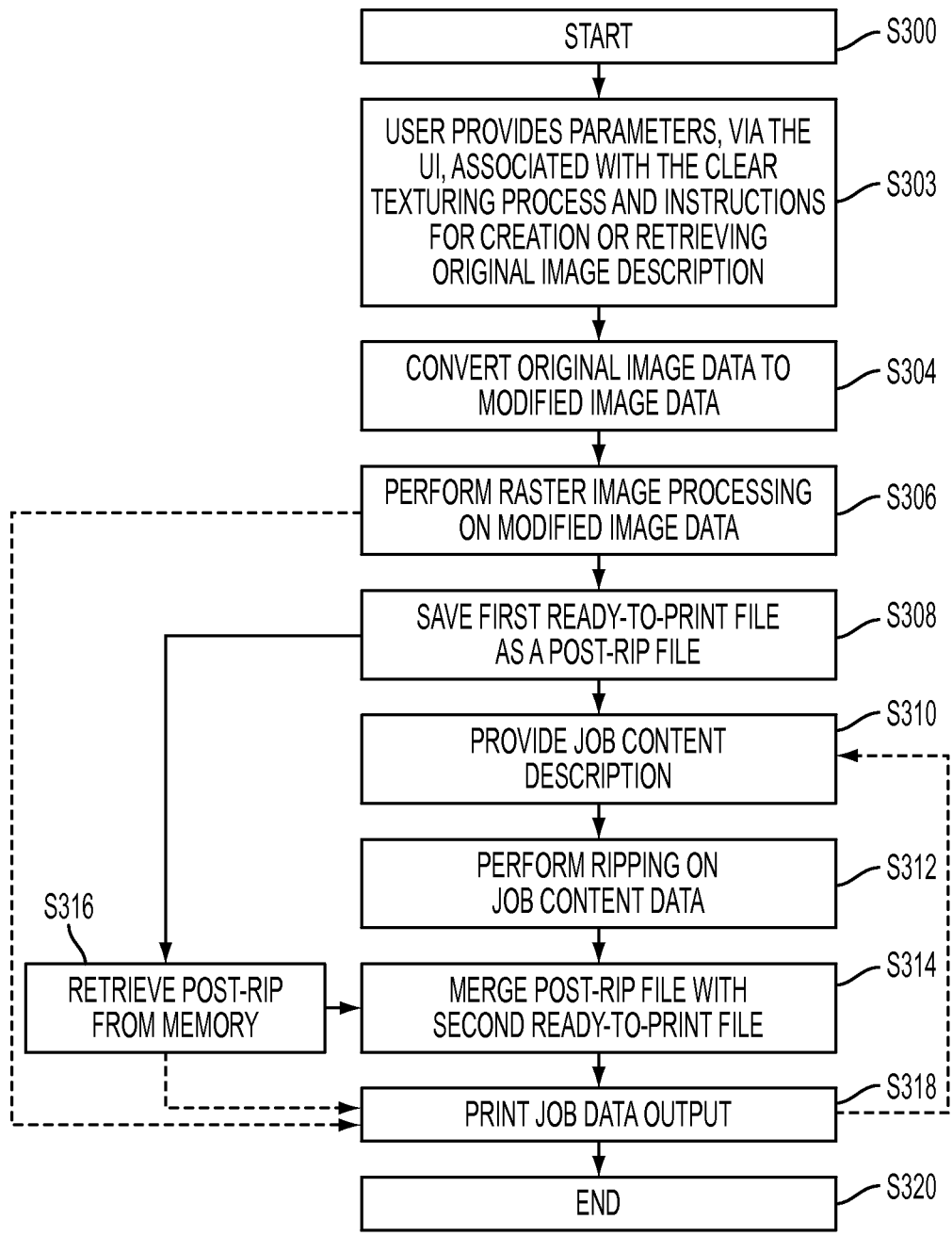
FIG. 3 is a flow chart illustrating a method for generating the job data output.
Figure 4:
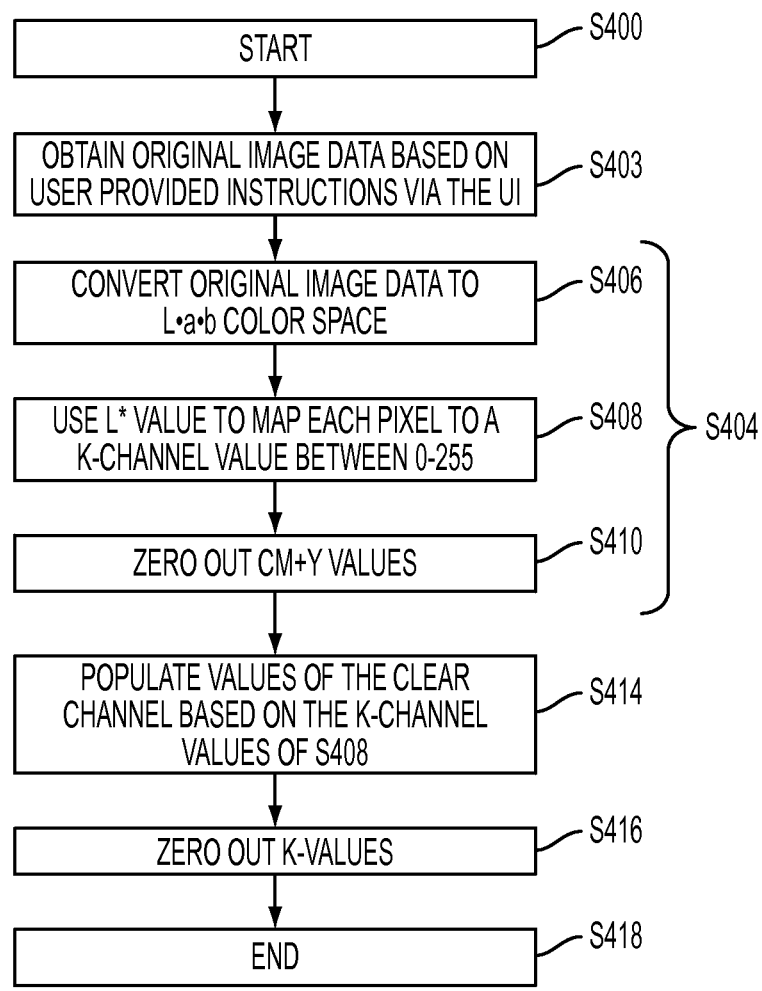
FIG. 4 is a flow chart illustrating an exemplary embodiment for converting the original image data to modified image data; and, FIG. 5 is a flowchart describing an exemplary embodiment for selectively applying clear toner according to this disclosure.
Figure 5:
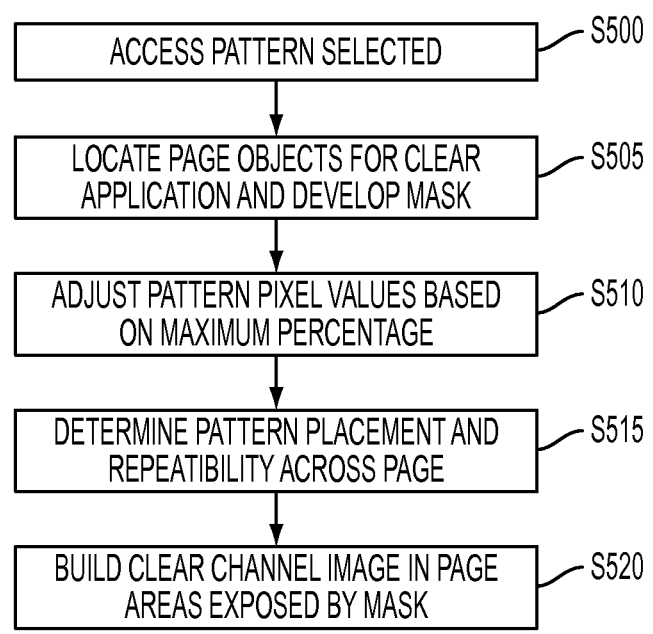

The methods illustrated in FIGS. 3-5 may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

With reference to FIG. 1, a functional block diagram of a computer system 10 is shown. The illustrated computer system 10 includes a processor 12, which controls the overall operation of the computer system 10 by execution of processing instructions which are stored in memory 14 connected to the processor 12. The system 10 may include multiple processors, wherein each processor is allocated to processing particular (sets of) instructions. Computer system 10 also includes a network interface and a user input output (I/O) interface. The I/O interface may communicate with one or more of a display, for displaying information to users, and a user input device, such as a keyboard or touch or writable screen, for inputting instructions, and/or a cursor control device, such as a mouse, trackball, or the like, for communicating user input information and command selections to the processor. The various components of the computer 10 may be all connected by a bus 16. The processor 12 executes instructions for performing the method outlined in FIGS. 3-5. The computer system 10 may be a PC, such as a desktop, a laptop, palmtop computer, portable digital assistant (PDA), server computer, cellular telephone, pager, or other computing device (e.g., multifunction printer/copier device) capable of executing instructions for performing the exemplary method.

The memory 14 may represent any type of tangible computer readable medium such as random access memory (RAM), read only memory (ROM), magnetic disk or tape, optical disk, flash memory, or holographic memory. In one embodiment, the memory 14 comprises a combination of random access memory and read only memory. In some embodiments, the processor 12 and memory 14 may be combined in a single chip. The network interface allows the computer to communicate with other devices via a computer network, such as a local area network (LAN), a wide area network (WAN), or the internet, and may comprise a modulator/demodulator (MODEM). The memory 14 stores instructions for performing the exemplary method as well as the processed data.

FIG. 1 further illustrates the computer system 10 connected to a GUS (Graphical User Interface) 200 and an original image source 18 for inputting image data 19 (in the form of a description of the original image) into the computer system 10. This original image source 18 may include an image capture device, such as a scanner or a camera, for converting an original colored or monochrome image 19 into an electronic format. A job content source 20 is also connected to the computer for inputting job content data 21 into electronic format. This job content source 20 may include the same or a separate image capture device, such as a scanner, a computer, or the like. In one embodiment, the job content source 20 may include an input device, such as, for example, a keyboard, for typewriting or digitally creating the variable content.

In another embodiment, the original image and/or job content 19, 21 can be input from any suitable source, such as a workstation, a database, a memory storage device, such as a disk, or the like. Typically, each input digital image includes original image data for an array of pixels forming the image. The image data may include colorant values, such as grayscale values, for each set of color separations, such as CIELAB or RGB, or be expressed in other color space in which different colors can be represented. In general, "grayscale" refers to the optical density value of any single image data channel, however expressed (e.g., CIELAB, RGB, YCbCr, etc.). The images may be photographs, video images, combined images which include photographs along with text, and/or graphics, or the like. The images may be received in JPEG, GIF, JBIG, BMP, TIFF or other common file format used for images and which may be converted to another format such as CMYK colorant values prior to processing. Input textured and original images may be stored in the data memory during processing.

The electronic original image and job content data is processed by the processor 12 according to the instructions contained in the memory 14. The memory 14 stores an image data interpretation component 22, a conversion component 24, a determination component 26, and a merging component 28. These components 22-28 will be later described with reference to the method. The data undergoes processing according to the various components for generating a print instruction, which is stored in the data memory 30.

The original image and job content sources 18, 20 are in communication with a controller 32 or digital front end (DFE) containing the processor 12 and memories 14, 30. This controller 32 may be formed as part of at least one image forming apparatus for controlling an operation of at least one marking (or print) engine. Alternatively, the controller 32 may be contained in a separate, remote device that is connected with the image forming apparatus. The print instruction data may be output from the controller 32 for further print processing at the print engines.

The image forming apparatus includes at least one print engine 34. A clear toner applying component, such as cartridge 36, supplies clear toner for applying to a substrate passing through the print engine 34. In the illustrated embodiment of FIG. 1, the substrate 46 is delivered to the print engine from tray 48. A monochrome or color applying component (i.e., a source of pigmented toner), such as colorant toner cartridges 38-44, supplies at least one pigmented colorant (CMYK or other pigmented colorants) for applying colored toner to the substrate passing through the print engine 34. The clear toner applying component 36 and the colored toner applying component(s) 38-44 are illustrated as being included in one print engine 34; however, alternative embodiments are contemplated for including the clear toner applying component 36 in a first print engine and the colored toner applying component(s) 38-44 in a second print engine (not shown). The second print engine may receive the substrate 46 from the first print engine via a paper path. Alternatively, a colored toner applying component 38-44 may be included in a first print engine and a clear toner applying component 36 may be included in a second print engine. The substrate 46 may move from the first to the second print engine via a paper path or via the user taking the substrate from an output tray of the first print engine and placing it in an input tray of the second print engine.

The marking engine 34 includes many of the hardware elements employed in the creation of desired images by electrophotographical processes. In the case of a xerographic device, the marking engine typically includes a charge retentive surface, such as a rotating photoreceptor in the form of a belt or drum. The images are created on a surface of the photoreceptor. Disposed at various points around the circumference of the photoreceptor are xerographic subsystems which include a cleaning device, a charging station to be applied (one in the case of a clear toner applying printer, four in the case of a CMYK printer, and five in the case of a CMYK and clear toner applying printer), such as a charging corotron, an exposure station, which forms a latent image on the photoreceptor, a developer unit, associated with each charging station, for developing the latent image formed on the surface of the photoreceptor by applying a toner to obtain a toner image, a transferring unit, such as a transfer corotron, for transferring the toner image thus formed to the surface of a print media substrate, and a fuser, which fuses the image to the substrate. The fuser generally applies at least one of heat and pressure to the sheet to physically attach the toner.

As mentioned, the present disclosure is directed toward a mark in the form of an authenticating or watermark rendered on a substrate. The mark is applied with a clear toner. The mark is observed as a generally glossy image. The disclosure is more specifically directed toward a method of generating the generally clear mark on a form of the system.

Figure 2:
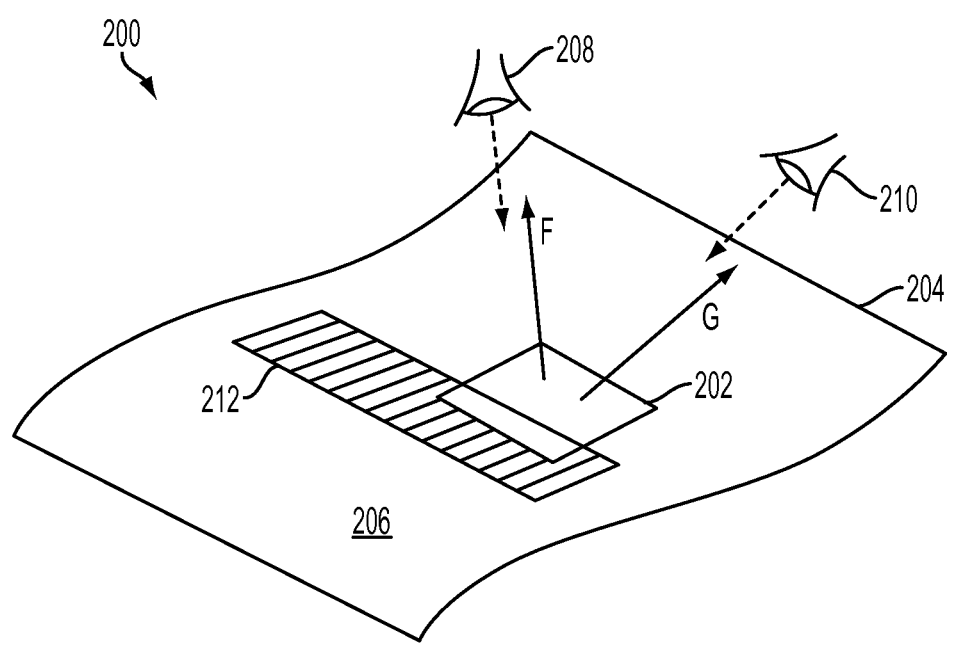
FIG. 2 illustrates a perspective view of a job output using the system of FIG. 1.

FIG. 2 illustrates a print output 200 including a mark 202 rendered on a substrate 204. The mark 202, as mentioned, includes an observable watermark or authenticating mark formed on a surface portion of the substrate 204. The mark 202 is generally transparent, so it appears at first glance to be unobservable. However, the mark 202 includes a visual characteristic that alters the surface portion in relation to a surrounding surface portion 206 (or background) of the substrate 204. This characteristic may include, for example, a generally glossy appearance. The appearance may alternatively include, for example, a slight cast.

More specifically, the mark 202 may have a flat or matte appearance F when it is viewed from a generally perpendicular position 208 situated generally above the mark 202. However, the mark 202 is observable as a glossy appearance when it is viewed from an angled position 210 relative to the substrate 204. One aspect of the disclosure is that the mark 202 is observable without requiring a use of a visual aid.

In one embodiment, the substrate 204 may include a matte appearance. Accordingly, the glossy mark 202 is observable as an image having the generally glossy appearance, which is surrounded by a generally matte background 206. In another embodiment, the substrate 204 may also include a glossy appearance. In this embodiment, the mark 202 may include a first degree of gloss, and the substrate 204 may include a second degree of gloss. The first degree of gloss is not equal to the second degree of gloss. In one embodiment, the first degree of gloss is greater than the second degree of gloss.

With continued reference to FIG. 2, the mark may be included on a substrate 204 that also carries a second image in the form of content 212. As mentioned, this content is rendered on the substrate 204 as pictorial images, graphics, text, and the like. The content 212 is formed from a layer of colored or monochrome toner. The content 212 includes a generally flat or matte appearance characteristic at perpendicular and angled perspectives. Embodiments are contemplated, however, to include content 212 also having a gloss characteristic. Because the colored and/or monochrome toner includes pigmented material, the content 212 is observable as having a generally visible color contrast relative to the substrate 204. The mark 202 is alternatively observable as not having a generally visible color contrast relative to the substrate 204.

With reference to FIG. 3, a flow chart is provided for describing a clear texturing process of forming a job data including a clear texture. The method starts at S300. Initially, a user provides parameters, via a UI, associated with the execution of the clear texturing process, and instructions for the creation or retrieval of an original image description. The original image includes a monochrome or a colored image selected for use as the mark. For example, a selected pictorial image, such as a monogram, may be input into the system for use as the mark on letterheads or formal documents. The colored monogram is used as a starting sample, and data pulled from the original monogram image is converted so that a clear monogram image may be output instead. Other examples include festive pictorial images for use on holiday cards or invitations, authenticating marks for use on security documents, company logos on prepared documents, and the like.

The original image may be input into the system using the image source 18 described for FIG. 1. In particular embodiments, the original image may be generated using a computer or a scanner. In other embodiments, the original image may be stored in a memory or database. The original image data is then provided to the system by selectively accessing the memory or database.

The original image is provided at S303 as digital image data in a multiple channel color plane. Generally, a (full) colored original image includes an image description in a color space that is three-dimensional. More particularly, the color may be parameterized by three numbers (or more depending on the color model or architecture being used). For example, a description for CMY data streams may be conveyed through three channels. A description for CMYK data streams may be conveyed through four channels. The system may utilize the Image Data Interpretation Component 22 of FIG. 1 to obtain the data. This data, for example, includes a C pixel value, an M pixel value, a Y pixel value, and a K pixel value. Each value associated with a pixel influences a placement of primary-color colorant (ink or toner) in a pixel area.

The system converts the original image data to modified image data in a clear channel color plane at S304. Methods of converting the original image data are later discussed with reference to FIG. 4. Generally, the multiple channel color plane is converted to a single clear channel color plane. A clear pixel value is determined using the conversion component 24 of FIG. 1.

According to another exemplary embodiment, the original image is converted to a 5 channel image (CMYK+clear) with only the clear channel having non-zero values. A print command may be instituted to render a clear image on a substrate using the clear channel color plane. Alternatively, a command may be selected to include the clear image as a fixed image on a form. At S306, raster image processing (RIPing) is performed on the modified image data (i.e., mark description) to translate the modified image data into a first ready-to-print file. A raster image processor (RIP) of the system provides output data in a format that is suitable for rendering by an output device. Generally, the RIP translates the modified image description into a bitmap for output by the output device. At this stage, a clear mark may be applied to a substrate at the image forming apparatus.

One aspect of the present disclosure, however, is a form for producing multiple, intermittent print jobs using the clear channel color plane. Accordingly, the first ready-to-print file may be saved as the form in the memory. The mark becomes a fixed image in a post-RIP file (see 50 of FIG. 1) at S308. For example, a Fast Reprint Format (FRF) may be used to save the post-RIP file. In one embodiment, the form is saved by default to a unique file location. The default location removes the clear mark forms from the standard background forms that do not utilize clear toner applying printing systems. Any known process may be used to save and subsequently process the print-ready format. In this manner, the form is created.

The post-RIP file may be selectively accessed at later dates. One example of when the post-RIP file may be accessed includes an addition of job information to the substrate of which the mark is to be applied. With continued reference to FIG. 3, job image (or content) data may be selectively provided at S310. As in a previously mentioned example, the content of an invitation-style document may include the pertinent information regarding times and dates, which may overlay or be rendered in proximity to the monogram mark. Other examples of documents may include business forms, custom calendars, and security documents, etc.

Generally, the mark description that is saved as the post-RIP file may be utilized for producing fixed images on substrates, and the content description that is subsequently provided may be utilized for job data images on the substrates. Accordingly, the mark description may be utilized in a formation of multiple documents and print jobs when an application for the form is selected by users.

The job content data is also provided in a second multiple channel color plane. Accordingly, the job content may be provided for printing in a colored or a monochrome format. The job content description may be generated from content or images input into the computer system by also using an input device, such as a keyboard, a scanner, etc. Alternately, the job content may be provided to the computer system by way of any of the examples set forth above.

To print a job data, a user may select a print option from a window, a menu, or the like corresponding to an application displaying the form. The user may selectively provide the job content before entering a print command. The print command institutes raster image processing on the job content data at S312 to provide a second ready-to-print file. This image processing is performed on the content data to translate it into a bitmap or similar page description. This page description is stored in data memory 30 until it is subsequently forwarded to the marking engine 34 for further processing.

The merging component 28 of memory 14 (see FIG. 1) is used to merge the post-RIP file with the second ready-to-print file at S314. Notably, merging operations are further described with reference to FIG. 5 below. In this manner, the merging component obtains the post-RIP (or first ready-to-print) file from the default location in the (main) memory 14 and the second ready-to-print file from data memory 30. More particularly, the bitmap of the processed mark image is retrieved from the memory 14 at S316 for merging with the image processed (bitmap of the) content information.

The merged bitmaps of the mark image and the content are forwarded to the marking engine for further processing. Accordingly, the job data may be rendered from the marking engine to produce the variable data output at S318. The process ends at S320. However, additional jobs may be subsequently created by returning to the form at S310, which provides for input of new or changed content information.

One aspect of the present disclosure is a controlled hierarchy of priority for the channels that are used during a printing scheme. As mentioned, a colored or monochrome original image is input into the computer system. However, the monochrome and/or color channels are shut off for image processing and/or printing of the original image as a clear image on the form. These values are shut off with the zero "0" value assignment for each channel other than the clear channel. The multiple channel color plane is converted to a modified channel color plane. In the present embodiment, this modified channel color plane is a clear channel color plane. Accordingly, only the clear channel is used during a printing operation for determining an amount of clear toner applied to a substrate.

With reference to FIG. 4, a flow chart is provided for describing a process for converting the original image data to modified image data. The process starts at S400. As previously mentioned, the original image that is provided and/or generated to the system includes multiple channels that handle data relating to the primary (RGB) or subtractive (CMYK) color planes. Original image data is obtained at S403 for each one channel of the multiple channel color plane. The original image data is based on user provided instructions via a UI. In a first stage of the conversion, the digital data obtained from a full-color original image is converted to a monochrome data set at S404. Many known techniques may be utilized to convert the colored digital data to the monochrome data set. There is no limitation made herein to the technique utilized. In one example, the original image data may be used to map a gray-level image.

Generally, regions are identified by assigned image pixel values in a suitable color space, such as the luminance value in the L*a*b* color space. The digital data of the original image is converted from a colored space to the device independent L*a*b* color space at S406. The data may be converted from the first color space to the L*a*b* color space using calculations, look-up tables, dedicated chips, portions of chips, (general-purpose) processors, and software.

In one embodiment, the values of the color space are combined into a single luminance value L* and the a* and b* values are discarded. Each pixel of the original image is described as the luminance value L*, representing brightness. The value of the pixel is mapped at S408 to a K-channel value between 0 and 255 on an 8-bit scale. The zero value (0) is assigned to black pixels and the 255 value is assigned to white pixels. Any value situated in between the 0 and 255 range describes a different shade of gray. The shades of gray correspond to the gray-scale intensity between 0 and 255 for each one pixel of the original image data. The monochrome results make up the monochrome set. The amounts of monochrome toner that would be applied to the substrate in a monochrome print operation correspond to the gray-scale intensity.

In another embodiment, the monochrome set may also be derived by an inverse of the luminance L* signal of the L*a*b* color space. Generally, colored image data is converted to the monochrome data set because the K-values of the colored space take into account the CM and Y values of the color space. Therefore, the monochrome data set is derived from the L* signals at S408, and the CMY data is essentially "shut off" at S410. The system shuts off the CM and 7 channels by replacing the pixel values to zero "0". As mentioned, if the present modified (mark) image were printed at this stage of the process, the monochrome output would be produced. However, further actions are performed on the modified mark image to produce a clear image output. At S414, values of the clear channel are populated based on the K-channel values of S408. Then, at S416, the K-values are zeroed out of S408. In other words, after the clear channel is mapped using the non-zero K-values, the K-value of the monochrome set is reassigned a zero "0" value at S416. Accordingly, any non-zero value is mapped in the clear channel plane while the other CMY and K-channels of the color space are shut off with assigned zero "0" values.

In one embodiment, the clear channel pixel value may be used as an input variable for computing an amount of clear toner. This amount may include, for example, a clear toner halftone value that is computed at either of the system or the printer. Different clear toner halftone values are assigned to pixels of a substrate surface region to render the mark image. The different halftone values for pixels across the region may vary a gloss characteristic of the mark image across the region. This gloss characteristic may provide perceived, observable elements to the image at certain angled perspectives. The conversion process ends at S418.

In job data, there may be content that also includes a description in a second multiple channel color plane. Accordingly, a colorant toner renders the content onto the same substrate carrying the clear toner layer of the mark. However, there may be instances when the job data includes a five channel color plane. More particularly, the description for the job content may include multiple color channels (e.g., CMY and K-channels) and a clear channel. One example of content that may utilize all five channels may include a colored image having a glossy appearance. Accordingly, there may be instances when both the post-RIP file and the second ready-to-print file include instructions for rendering clear toner layers. In these instances, the computer system controls the application of clear toner based on a predetermined, programmed hierarchy.

With reference to FIG. 5, illustrated is a flow chart describing an exemplary embodiment for selectively applying clear toner according to this disclosure. Notably, as will be described below, prior to the execution of the flow chart, a user selects a clear channel pattern for rendering.

In order to build the selected clear channel pattern, a process, illustrated by the flow chart of FIG. 5, performs the following:

S500: Access clear channel pattern selected by the user;

S505: Locate page objects for clear toner application and develop a mask. The mask will differ across pages based on page content;

S510: Adjust pattern pixel values based on maximum percentage of toner to be used based on user selection;

S515: Determine clear channel pattern placement and repeatability across the page based on user selection; and S520: Build clear channel image in page areas exposed by the mask.

A further embodiment may include a clear toner layer rendered as an underlay with a knockout. Accordingly, the top layer of CMYK or similar pigmented toners may prevent the clear layer from being printed.

Although the control methods of FIGS. 3-5 are illustrated and described below in the form of a series of acts or events, it will be appreciated that the various methods or processes of the present disclosure are not limited by the illustrated ordering of such acts or events. In this regard, except as specifically provided hereinafter, some acts or events may occur in different order and/or concurrently with other acts or events apart from those illustrated and described herein in accordance with the disclosure. It is further noted that not all illustrated actions may be required to implement a process or method in accordance with the present disclosure, and one or more such acts may be combined. The illustrated methods and other methods of the disclosure may be implemented in hardware, software, or combinations thereof, in order to provide the control functionality described herein, and may be employed in any system including but not limited to the above illustrated system 10, wherein the disclosure is not limited to the specific applications and embodiments illustrated and described herein.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A printing apparatus comprising:
   a UI (User Interface);
   a printing device; and
   a controller operatively connected to the UI and printing device, the controller configured to execute computer readable instructions, that when executed, perform a method of printing clear texturing on a first media substrate and a second media substrate distinct from the first media substrate using a clear toner material associated with the printing device, the method comprising:
   a) receiving one or more user selectable instructions from the UI to execute a clear texturing process to be performed on the first and second media substrates using a clear toner material, wherein the user selectable instructions include parameters associated with a clear textured first image to be printed on the first and second media substrates, using a clear toner material, the first image converted to a single full page clear channel bitmap plane;
   b) receiving image data associated with a second image to be printed on the first media substrate using one or more colorants not associated with the clear texturing process, the first image and second image distinct, and the second image converted to a first set of one or more respective full page colorant bitmap planes distinct from the clear channel color plane;
   c) processing the first set of colorant bitmap planes to print the second image on the first media substrate with the one or more colorants, and processing the full page clear channel bitmap plane to print the clear textured first image on the first media substrate over the printed second image with the clear toner material;
   d) receiving image data associated with a third image to be printed on the second media substrate using one or more colorants not associated with the clear texturing process, the first image, second image and third image distinct, and the third image converted to a second set of one or more respective full page colorant bitmap planes distinct from the clear channel color plane; and
   e) processing the second set of colorant bitmap planes to print the third image on the second media substrate with the one or more colorants, and processing the full page clear channel bitmap plane to print the clear textured first image on the second media substrate over the printed third image with the clear toner material.

2. The printing apparatus according to claim 1, wherein the parameters include one or more of media sheet area coverage; object type the clear texturing process is to be performed on; max percentage of clear material to be used for printing the clear textured first image; and clear texturing techniques to be used for printing the clear textured first image.

3. The printing apparatus according to claim 1, wherein the parameters include media sheet area coverage specified as all or a part of the media substrate.

4. The printing apparatus according to claim 1, wherein the parameters include one or more page object types the clear processing is to be performed on, and the page object types include one or more of images, text, graphics and spot colors.

5. The printing apparatus according to claim 1, wherein the parameters include one or more clear texture positioning techniques to be used for printing the clear textured first image, and the techniques include one or more of stretch, shrink, step and repeat, and clip.

6. The printing apparatus according to claim 1, step a) further comprising:
   rasterizing the converted first image to generate a first ready-to-print file; and
   storing in a memory device the first ready-to-print file.

7. A computer program product storing computer readable instructions on a non-transitory computer media, that when executed by a controller, cause the controller to perform a method of printing clear texturing on a first media substrate and a second media substrate distinct from the first media substrate associated with a printing apparatus including a UI (User Interface), the controller and a printing device, the method comprising:
   a) receiving one or more user selectable instructions from the UI to execute a clear texturing process to be performed on the first and second media substrates using a clear toner material, wherein the user selectable instructions include parameters associated with a clear textured first image to be printed on the first and second media substrates, using a clear toner material, the first image converted to a single full page clear channel bitmap plane;

b) receiving image data associated with a second image to be printed on the first media substrate using one or more colorants not associated with the clear texturing process, the first image and second image distinct, and the second image converted to a first set of one or more respective full page colorant bitmap planes distinct from the clear channel color plane;

c) processing the first set of colorant bitmap planes to print the second image on the first media substrate with the one or more colorants, and processing the full page clear channel bitmap plane to print the clear textured first image on the first media substrate over the printed second image with the clear toner material;

d) receiving image data associated with a third image to be printed on the second media substrate using one or more colorants not associated with the clear texturing process, the first image, second image and third image distinct, and the third image converted to a second set of one or more respective full page colorant bitmap planes distinct from the clear channel color plane; and e) processing the second set of colorant bitmap planes to print the third image on the second media substrate with the one or more colorants, and processing the full page clear channel bitmap plane to print the clear textured first image on the second media substrate over the printed third image with the clear toner material.

8. The computer program product according to claim 7, wherein the parameters include one or more of media sheet area coverage; object type the clear texturing process is to be performed on; max percentage of clear material to be used for printing the clear textured first image; and clear texturing techniques to be used for printing the clear textured first image.

9. The computer program product according to claim 7, wherein the parameters include media sheet area coverage specified as all or a part of the media substrate.

10. The computer program product according to claim 7, wherein the parameters include one or more page object types the clear processing is to be performed on, and the page object types include one or more of images, text, graphics and spot colors.

11. The computer program product according to claim 7, wherein the parameters include one or more clear texture positioning techniques to be used for printing the clear textured first image, and the techniques include one or more of stretch, shrink, step and repeat, and clip.

12. The computer program product according to claim 11, step a) further comprising:

rasterizing the converted first image to generate a first ready-to-print file; and storing in a memory device the first ready-to-print file.

* * * * *